Feb. 18, 1969  R. A. SMITH  3,427,902
CRANES

Filed Jan. 30, 1967  Sheet 1 of 3

Inventor:
Robert Arthur Smith,
By Price, Scheffler & Parker
his Attorneys

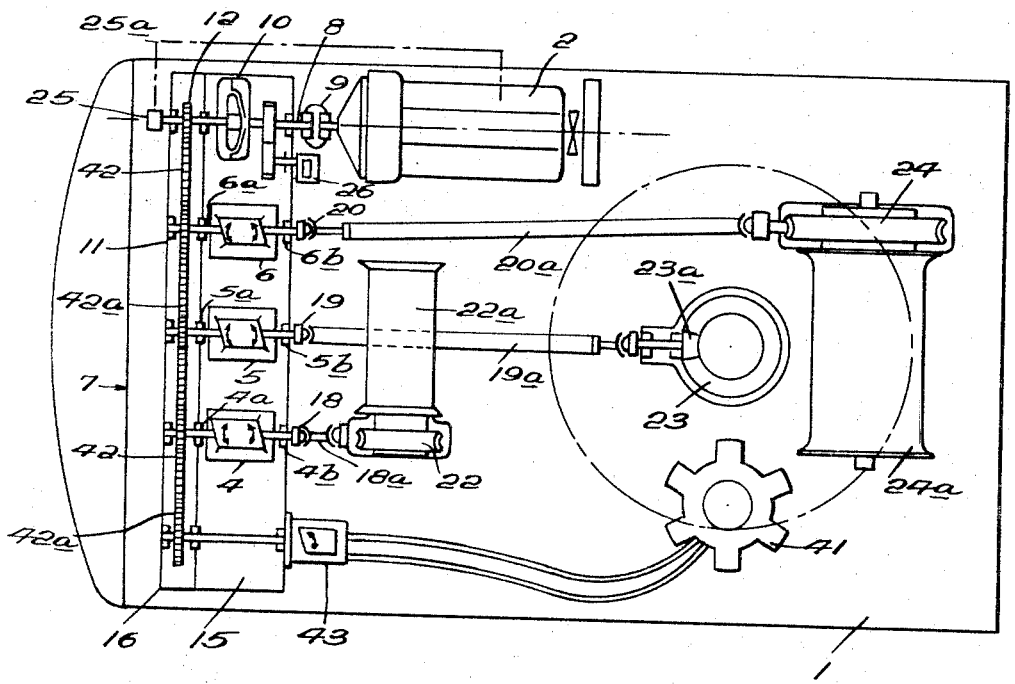

United States Patent Office 3,427,902
Patented Feb. 18, 1969

3,427,902
CRANES
Robert Arthur Smith, Letchworth, England, assignor to K & L Steelfounders and Engineers Limited, Letchworth, England, a British company
Filed Jan. 30, 1967, Ser. No. 612,399
Claims priority, application Great Britain, Feb. 7, 1966, 5,192/66
U.S. Cl. 74—859                                    7 Claims
Int. Cl. F02d 35/00; F16h 47/04; B66c 23/36

ABSTRACT OF THE DISCLOSURE

A mechanical power transmission system having a prime mover coupled to drive a plurality of driven members through a torque converter and a plurality of hydro-static, variable swash, transmission units. Each driven member being coupled through a transmission unit to the torque converter so that for any given power input to the torque converter, overload on at least one of the driven members results in a proportional increase in torque to and a decrease in speed of the input to the transmission units.

---

This invention relates to a mechanical power transmission system and to apparatus incorporating said transmission system.

The transmission system of the present invention is particularly applicable to cranes.

The term "crane" as used herein includes hoist, winch, derrick, and the like, each of which has a prime mover and a plurality of members to be driven either by the prime mover or by alternate means. A "driven member" or a "member to be driven" of the crane includes means, which when driven, provide such functions or operations as slewing, main hoists, derrick hoist, crane travel, electrical generator and the like.

It will be apparent to persons skilled in the relevant art that the transmission system of the present invention is further applicable to apparatus other than cranes which apparatus incorporates a prime mover and a plurality of members to be driven by the prime mover or by alternate means. Examples of such apparatus are earth moving equipment, dump trucks and agricultural and industrial tractors; a "driven member" or "member to be driven" of such apparatus providing, in the appropriate applications when driven, for example power services for hydraulically operated digging arms, bucket and bucket arms, tipping and dump mechanisms and the like.

Preferably all of the driven members of a crane should be driven or be capable of being driven by a single prime mover which is associated with the crane. By use of such a transmission system considerable expense is saved in the manufacture of the crane. Several systems of this kind are well known in the art and usually include a prime mover (for example an internal combustion engine, an electric motor or a diesel motor) the power output from which is directly coupled to impart rotary motion to a twin set of gear wheels, so that the first set is driven in one sense of direction and the other set is driven in the reverse sense of direction. When required, a member of the crane to be driven is coupled through a clutch mechanism by the crane operator to either set of gear wheels and drive is imparted to the driven member in a direction which is dependent on the set of gear wheels engaged. It often occurs that all the driven members are required simultaneously and it will be apparent that in such circumstances it becomes very easy to overload the prime mover. This often results in the prime mover stalling or being damaged. The coupling between the prime mover and a driven member is in each case obtained directly through a clutch or similar mechanism and initial control in the transmission of power to the driven member becomes very difficult to obtain. This, as will be appreciated, is very unsatisfactory and is especially so when the driven member is the main hoist since it can result in jerky initial movement during lifting and lowering of a load carried by the crane. Such a jerky action is obviously undesirable in instances where large loads must be lifted or lowered within close tolerances.

A further type of transmission system commonly applied to cranes includes a diesel motor mechanically coupled to drive an electrical generator which develops sufficient voltage to drive a plurality of motors each of which is connected, or capable of being connected, to drive a respective driven member. This type of system has a particular disadvantage in that, by using a common generator, independent and precise voltage control for driving each driven member cannot be attained and therefore speeds of operation of the driven members are directly related to each other and are invariable as regards load in a manner as above described in relation to the standard mechanical transmission system.

It is an object of the present invention to provide a mechanical power transmission system through which a plurality of driven members can be driven by a prime mover and which system can provide overall constant power regulation for the driven members.

According to the present invention there is provided a mechanical power transmission system which includes a prime mover; a plurality of hydro-static, variable swash, transmission units driven from the prime mover by drive means incorporating a torque converter, and in which each transmission unit has a power take-off shaft connected, or connectable, to drive a respective driven member; the arrangement being such that for any given power input to the torque converter, overload on at least one of the take-off shafts results in a proportional increase in torque to, and a decrease in speed of, the input of the transmission units.

Further according to the present invention there is provided apparatus having a plurality of members to be driven when incorporating the mechanical power transmission system as above provided to drive said members.

The transmission system according to the present invention provides a fine degree of control which can be exercised over each driven member regardless of the rate at which other driven members are being used. For example, in a crane which incorporates the present transmission system it will be possible for a crane operator to be running the prime mover at its maximum rated speed, to be raising substantial loads at very fast speeds on the main hoist and at the same time to be slewing the machine with great delicacy and precision.

A "hydro-static variable swash transmission unit" as referred to herein is well known in the art and includes a system in which a pump and motor each have a swash plate and in which the position of the swash plate is adjustable either in the pump or in the motor or in both, for the purpose of varying the relationship between the input and output of the system. The pump and motor can be conveniently housed in a common compact casing without external high pressure piping.

A "torque convertor" as referred to herein is well known in the art and provides means whereby, when incorporated in drive means, a control is exerted which results in the ratio of power input to power output of the convertor remaining substantially constant for any given speed of the drive means at the input of the convertor irrespective of the speed of the drive means at the output of the convertor.

One embodiment of the present invention as applied to a crane will now be described, by way of example only, and with reference to the accompanying diagrammatic drawings, in which:

FIG. 5 illustrates a further modification of a transmission system for a mobile slewing crane.

Figure 1:
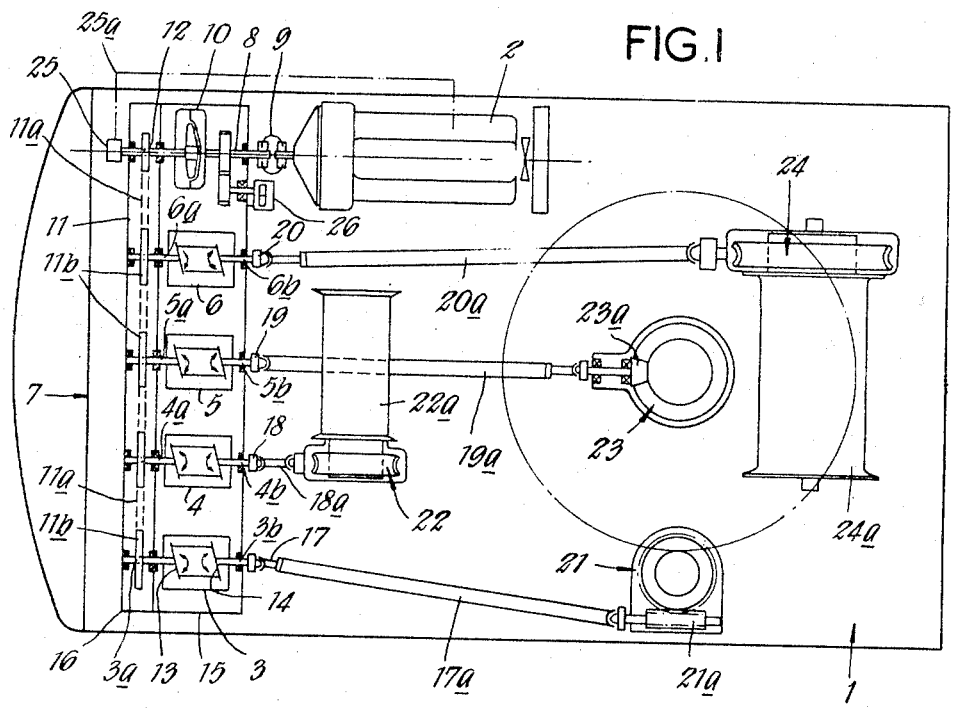
FIG. 1 is a plan view and illustrates the superstructure of a mobile slewing crane which incorporates a transmission system constructed according to the present invention.

Referring firstly to FIG. 1, the crane superstructure shown generally at 1 is rotatably mounted for controlled slewing movement on a crane travel carrier (not shown) which can conveniently be in the form of caterpillar tracks or wheeled chassis and carries a prime mover in the form of an internal combustion engine 2 the power from which is delivered to four hydro-static variable swash transmission units 3 to 6 through drive means shown generally at 7. The drive means 7 comprises a power shaft 8 which is connected by a flexible coupling 9 to be rotated by the engine 2, a torque convertor 10 situated in the power shaft 8 and a mechanical distribution system 11 which is mechanically coupled at 12 to be driven by the power shaft 8 at a speed dependent on the output from the torque convertor in relation to the input to the shaft 8. The distribution system 11 is in the form of a chain drive 11a which is reeved over multiple wheels 11b so that the individual transmission units 3 to 6 are driven at definite fixed speed relationships to each other through unit input shafts 3a to 6a respectively, each input shaft being rotatably driven by a wheel 11b.

Each of the hydro-static variable swash transmission units 3 to 6 is of a well known type and incorporates a pump swash plate generally indicated at 13 and a motor swash plate generally indicated at 14, both of which are adjustable. Each of the pump swash plates is coupled to its respective unit shaft input 3a to 6a and each motor swash plate is coupled to a respective take-off shaft 3b to 6b. By adjusting the relative position of either, or both the pump and/or the motor swash plate, for any given speed of rotation of a unit input shaft, an infinite range of rotational speed is obtainable for the take-off shaft which speed of rotation can be varied from zero to a known maximum in either sense of rotational direction.

The transmission units and torque convertor are housed in a casing 15 provided on the superstructure 1. The mechanical distribution system 11 is housed in a chamber 16 located adjacent the casing 15 which chamber can conveniently be used as an oil reservoir for the transmission units.

The take-off shafts 3b to 6b are connected by universal couplings 17 to 20 respectively and axially rotatable propellor shafts 17a to 20a respectively to driven members of the crane. In the present example, the propellor shaft 17a is coupled to drive the slewing mechanism shown generally at 21 through a worm nut mechanism 21a; the propellor shaft 18a is coupled to drive the axially rotatable drum 22a of a derrick hoist shown generally at 22; the propellor shaft 19a is coupled to drive the crane travel mechanism shown generally at 23 through a set of reduction gears 23a; and the propellor shaft 20a is coupled to drive the axially rotatable drum 24a of a main hoist shown generally at 24. Consequently rotation of any or all of the propellor shafts 17a to 20a results in operation of the respective driven member.

When power is transmitted through the drive means 7, any or all, of the driven members 21 to 24 can be actuated by adjustment of the swash plates of the respective transmission units 3 to 6 as required by a crane operator. The resultant rotary speed of the driven propellor shaft or shafts can be controlled in either sense of direction and at any speed varying from zero to a known maximum.

Assuming now that one or more of the driven members 21 to 24 is overloaded with respect to any given torque in the mechanical distribution system 11.

In previously known transmission systems for cranes in which the prime mover is directly coupled to the driven members, overload on a driven member could cause the engine to stall. This results in the undesirable condition in which, if one member is required to be driven by constant torque consistent with the maximum power available of the prime mover, it is not possible to operate more than that one driven member at any one time, which is clearly an unacceptable proposition.

In the transmission system according to the present invention the ratio of power input to power output of the torque convertor remains substantially constant for any given speed of rotation of the power shaft 8 at the input to the convertor, irrespective of the speed of the drive means 7 at the output of the convertor. Consequently, by overloading any or all of the driven members 21 to 24, the control effected by the torque convertor 10 results in a proportional increase in torque to, and a decrease in rotary speed of, the unit input shafts 3a to 6a and the relevant driven members continue to be driven during overload but at reduced speeds. It is thus seen that by incorporating the torque convertor and transmission units in the mechanical transmission system, a plurality of members can be driven simultaneously, even during overload, without conscious power balancing on the part of the crane operator.

By use of the transmission system according to the present invention, smooth control is obtained during initial operation of a driven member and overload on one or more of the driven members (for any given power output of the prime mover) automatically results in a decrease in speed of operation of the driven member or members without failure of the prime mover. A limiting condition can be reached at which substantial overload results in, for practical purposes, zero speed in operation of the driven members, again without failure of the prime mover.

Several modifications are possible to the above described and illustrated mechanical transmission system. The prime mover 1 can conveniently be in the form of an electric or diesel motor. The mechanical distribution system 11 can be provided by a gear train or similar system. Additional transmission units and driven members can be incorporated as considered necessary.

In FIG. 1 additional features are associated with the transmission system to provide efficient running of the crane. A constant speed governor 25 is coupled with the output from the torque convertor 10 and connected by a conrtol link 25a to the engine 2 so that for a given variation in the rotary speed of shaft 8 from the torque convertor 10, the governor 25 results in a proportional variation in torque to the input of the convertor 10. Driven from the power shaft 8 is a hydraulic boost pump 26 which provides an additional hydraulic pressure for the torque convertor 10, the transmission units 3 to 6 and other features which may be incorporated in the crane such as cooling system. The pump 26 can conveniently provide a power source for ancillary purposes such as fail-safe brakes on the individual driven members.

Figure 2:
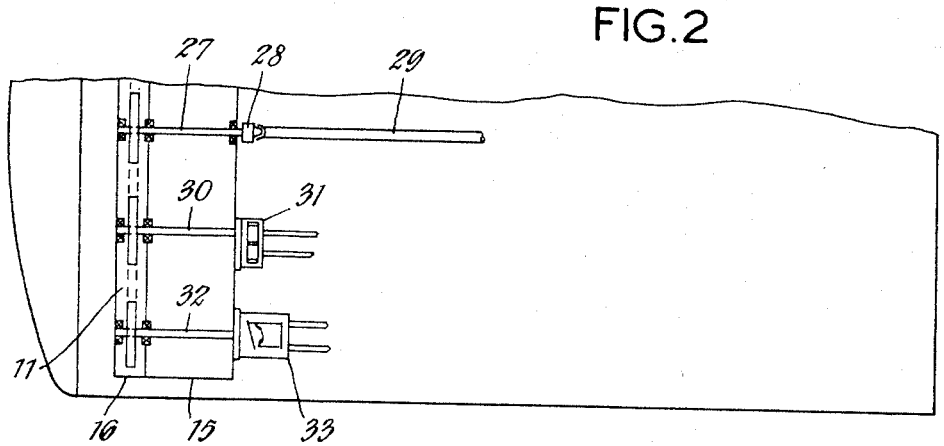
FIG. 2 is a similar view to FIG. 1 and illustrates additional driven members which can be coupled with the transmission system.

In FIG. 2, additional driven members are illustrated as being coupled to the mechanical distribution system 11 together with the transmission units 3 to 6 and include a direct drive 27 connected by a universal coupling 28 to a direct power driven propellor shaft 29 for use as required; a direct drive 30 to a gear pump 31 for use with alternative types of hydraulic circuit; and a direct drive 32 to a variable delivery over center adjustable swash plate pump 33 for use in conjunction with a remotely mounted motor of either fixed or variable stroke design.

Figure 3:
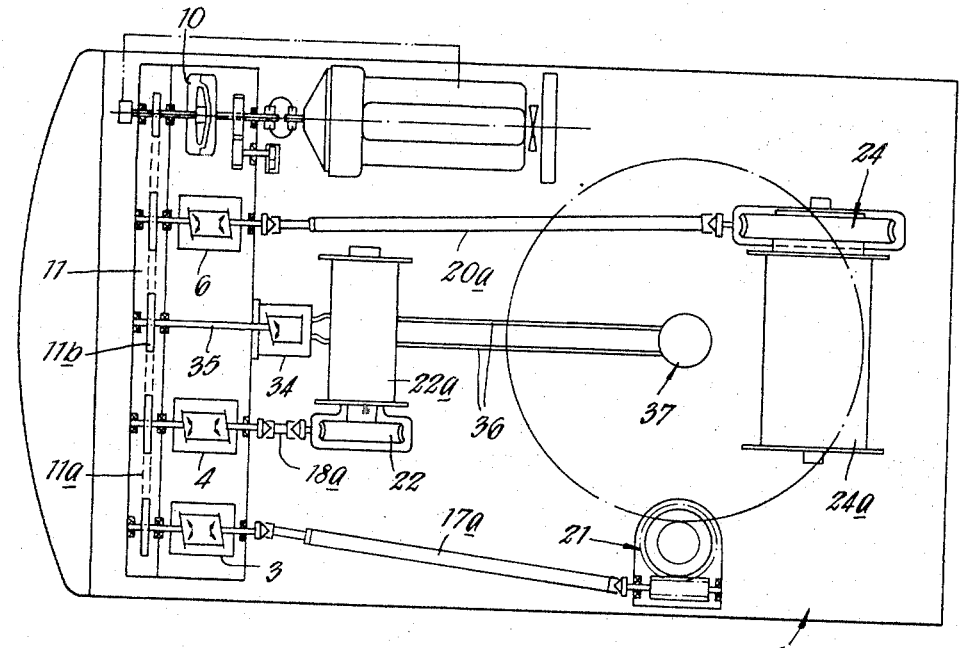
FIGS. 3 and 4 are similar views to FIG. 1 and illustrate modifications in the transmission system of the present invention.
Figure 4:
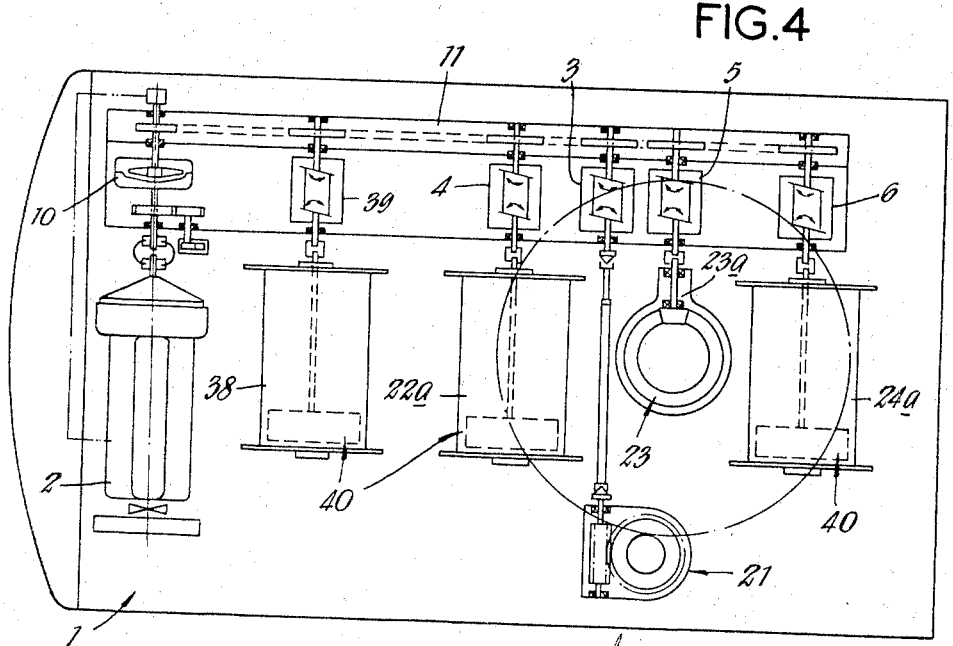

Several modifications of the above described mechanical power transmission system as applied to a crane will now be considered with reference to FIGS. 3 and 4. In these figures like parts or members to those illustrated in FIGS. 1 and 2 have been accorded like reference numerals for ease of description.

In FIG. 3 the crane travel mechanism is operated through an adjustable swash plate pump 34 which is driven through a power input shaft 35 taken directly from the mechanical distribution system 11. The pump 34 is connected by conduits 36 and a suitable rotary joint shown generally at 37 to a hydraulic motor (not shown) located on the crane travel carrier operation of which motor causing travel movement of the crane.

In the modification illustrated in FIG. 4 a re-arrangement is shown of the driven members and the mechanical distribution system. In this case the mechanical distribution system 11 is situated along the side of the crane superstructure and the prime mover 2 is situated transversely across the rear of the crane superstructure. An auxiliary axially rotatable drum 38 is provided which is driven from the mechanical distribution system 11 through a hydro-static variable swash transmission unit 39. The drum 38 can conveniently be utilised for opening and closing control of a grab carried by the main hoist. The rotatable drums 22a, 24a and 38 are driven from their respective transmission units through a high reduction gearing set shown generally at 40. The gearing sets 40 are conveniently housed within their respective drums and preferably take the form of an epicyclic train, a compound epicyclic set or a similar high reduction co-axial gearing unit as is well known in the relevant art. By the arrangement of the hydro-static, variable swash, transmission units and of the axially rotatable drums shown in FIG. 4, the take-off shafts from the transmission units can be arranged to be coaxial with their respective drums, and each drum can be rotatably driven through its gearing set directly from its transmission unit and not through a uni-mechanical power transmission system of the present inversal coupling.

In a further modification of the mechanical power transmission system of the present invention the slewing mechanism shown generally at 21 in FIGS. 1, 3 and 4 can be replaced by a slewing mechanism in the form of a high torque, low speed, hydro-static motor 41 (see FIG. 5) which motor is used in conjunction with a variable delivery swash plate pump which is driven from the mechanical distribution system 11; it will be realised that this modification is similar in principle to the modified crane travel mechanism as above described with reference to FIG. 3.

FIG. 5 illustrates a still further modification of the mechanical power transmision system of the present invention in that the distribution system 11 (which in FIGS. 1 to 4 is shown in the form of a chain drive 11a), is shown in the form of a gear train 42 the gear wheels 42a of which are coupled so that the individual transmission units 4 to 6 and pump 43 are driven at definite fixed speed relationships to each other through unit input shafts 4a to 6a and 43a respectively.

I claim:

1. A mechanical power transmission system which includes a prime mover; drive means coupled to be driven by said prime mover; a plurality of driven members each coupled to an output from said drive means to be individually driven by said prime mover through said drive means; wherein the improvement comprises the incorporation of, a torque converter in said drive means and coupled to said prime mover so that, for a given power input to said drive means, overload on any one of said outputs from said drive means results in an increase in torque to, and a decrease in speed of said outputs; in combination with a plurality of variable swash transmission units through each of which a driven member is coupled to an output of said drive means.

2. A mechanical power transmission system according to claim 1 wherein the improvement comprises said outputs from said drive means being driven through said drive means at definite fixed speed relationships to each other.

3. A mechanical power transmission system according to claim 1 wherein the improvement comprises a power shaft rotatably driven by said prime mover and coupled to said torque converter, said drive means comprising said torque converter and a mechanical distribution system coupled to the output of said torque converter and coupled to individually drive said transmission units.

4. A mechanical power transmission system according to claim 3 wherein said mechanical distribution system includes the improvement which comprises a chain drive reeved over multiple wheels, said output from said drive means being mechanically coupled for rotation by a wheel.

5. A mechanical power transmission system according to claim 3 wherein said mechanical distribution system includes the improvement which comprises a gear train.

6. A mechanical power transmission system according to claim 3 in which said transmission units are operatively connected to a liquid reservoir wherein the improvement comprises that said mechanical distribution system is operatively situated in said reservoir.

7. A mechanical power transmission system according to claim 1 wherein the improvement comprises the incorporation of a speed governor operatively connected with the output of said torque converter and responsive to a predetermined variation in said output; a control link coupling said speed governor to said prime mover through which a signal from said speed governor can pass to said prime mover in response to said predetermined variation to result in a proportional variation in torque to the input of said torque converter.

References Cited

UNITED STATES PATENTS

| | | | |
|---|---|---|---|
| 2,549,490 | 4/1951 | Kuhl | 74—665 |
| 2,692,514 | 10/1954 | O'Leary. | |
| 2,924,121 | 2/1960 | Wilson | 74—665 X |
| 3,051,326 | 8/1962 | Brandt | 212—38 |
| 3,123,975 | 3/1964 | Ebert | 74—687 X |
| 3,213,709 | 10/1965 | Bjork | 74—665 |
| 3,221,896 | 12/1965 | Grall et al. | 212—38 |
| 3,102,434 | 9/1963 | Cramer | 74—859 |

ARTHUR T. McKEON, *Primary Examiner.*

U.S. Cl. X.R.

74—665, 687; 212—38